US012548545B2

(12) United States Patent
Armstrong et al.

(10) Patent No.: US 12,548,545 B2
(45) Date of Patent: Feb. 10, 2026

(54) AUDIO CANCELLATION SYSTEM AND METHOD

(71) Applicant: Sony Interactive Entertainment Inc., Tokyo (JP)

(72) Inventors: Calum Armstrong, London (GB); Alan Murphy, London (GB)

(73) Assignee: SONY INTERACTIVE ENTERTAINMENT INC., Tokyo (JP)

( * ) Notice: Subject to any disclaimer, the term of this patent is extended or adjusted under 35 U.S.C. 154(b) by 110 days.

(21) Appl. No.: 18/484,636

(22) Filed: Oct. 11, 2023

(65) Prior Publication Data

US 2024/0135912 A1 Apr. 25, 2024
US 2024/0233702 A9 Jul. 11, 2024

(30) Foreign Application Priority Data

Oct. 19, 2022 (GB) ..................................... 2215435

(51) Int. Cl.
*H04S 7/00* (2006.01)
*G10K 11/178* (2006.01)

(52) U.S. Cl.
CPC .. *G10K 11/17823* (2018.01); *G10K 11/17873* (2018.01); *H04S 7/303* (2013.01); *G10K 2210/3011* (2013.01); *G10K 2210/30231* (2013.01); *G10K 2210/3027* (2013.01); *H04S 2420/01* (2013.01)

(58) Field of Classification Search
CPC ....... G10K 11/17823; G10K 11/17873; G10K 2210/3011; G10K 2210/30231; G10K 2210/3027; H04S 7/303; H04S 2420/01
See application file for complete search history.

(56) References Cited

U.S. PATENT DOCUMENTS 5,754,662 A * 5/1998 Jolly ................ G10K 11/17825 381/71.4
2004/0213419 A1* 10/2004 Varma .................... H04R 3/005 381/71.11
2005/0053245 A1 3/2005 Hsu
2008/0019536 A1* 1/2008 Marrot ............ G10K 11/17823 381/71.4

(Continued)

FOREIGN PATENT DOCUMENTS

EP 2251860 A1 11/2010
EP 4105928 A1 12/2022
GB 2607947 A 12/2022

OTHER PUBLICATIONS

Combined Search and Examination Report for corresponding GB Application No. 2215435.5, 6 pages, dated Apr. 19, 2023.

(Continued)

*Primary Examiner* — Joseph Saunders, Jr.
(74) *Attorney, Agent, or Firm* — Kilpatrick Townsend & Stockton LLP

(57) ABSTRACT

A noise cancellation system comprising an audio identification unit configured to identify audio to which a noise cancellation process is to be applied, an output generation unit configured to generate one or more noise cancellation signals in dependence upon the identified audio, and two or more audio output units each configured to reproduce a respective subset of the generated one or more noise cancellation signals, such that the two or more audio output units are configured to produce different outputs.

20 Claims, 7 Drawing Sheets

(56) References Cited

U.S. PATENT DOCUMENTS

| | | | |
|---|---|---|---|
| 2014/0119569 | A1 | 5/2014 | Peeler |
| 2017/0178617 | A1 | 6/2017 | Christoph et al. |
| 2017/0241799 | A1 | 8/2017 | Yanni |

OTHER PUBLICATIONS

Extended European Search Report for corresponding EP Application No. 23198917.9, 8 pages, dated Feb. 16, 2024.
EP23198917.9, "Office Action", Oct. 28, 2025, 7 pages.

* cited by examiner

AUDIO CANCELLATION SYSTEM AND METHOD

CROSS-REFERENCE TO RELATED APPLICATION

This application claims the benefit of and priority to GB Application 2215435.5, filed Oct. 19, 2022, the entire disclosure of which is hereby incorporated by reference in its entirety and for all purposes.

BACKGROUND OF THE INVENTION

Field of the Invention

This disclosure relates to an audio cancellation system and method.

Description of the Prior Art

The "background" description provided herein is for the purpose of generally presenting the context of the disclosure. Work of the presently named inventors, to the extent it is described in this background section, as well as aspects of the description which may not otherwise qualify as prior art at the time of filing, are neither expressly or impliedly admitted as prior art against the present invention.

With the increase in the availability of high-speed internet connections, online voice communication has become a much more widespread feature. The increased usage of online voice communication has accelerated further in recent years due to both social factors (such as the Covid-19 pandemic which has led to a reduction in people meeting in person) and technological factors. Increasing numbers of devices are now provided with high-quality microphones that are useful for capturing audio for transmission—examples include laptops, mobile phones, and games consoles (and/or their associated controllers).

While online voice communication is used for many purposes, such as social calls and work meetings, they have found particular relevance within the gaming community. This can include both multiplayer gaming contexts (so as to enable competitors and/or team mates to communicate) and video game streaming contexts (in which a single player provides video of their gameplay, and optionally themselves with an audio commentary, to a number of viewers who are not playing the game).

However, with this increasing use of microphones for voice communication there are a number of issues. One such issue is issue is that of environmental sounds that are also picked up by a microphone—these can be distracting and/or annoying for listeners, as well as possibly making it difficult to hear the speaker. Existing arrangements address this by providing a push-to-talk (or similar) functions, thereby reducing the amount of time that a microphone is transmitting, or through software-based noise suppression techniques that isolate the user's voice in captured audio.

Such techniques can be inconvenient for a user when requiring inputs to control the audio quality, or can place a significant processing burden upon a system to perform noise suppression. This can lead to audio content to be of reduced quality (for example, by distracting a user or introducing a significant latency) in order to preserve the quality of the audio itself.

It is in the context of the above discussion that the present disclosure arises.

SUMMARY OF THE INVENTION

This disclosure is defined by claim 1.

Further respective aspects and features of the disclosure are defined in the appended claims.

It is to be understood that both the foregoing general description of the invention and the following detailed description are exemplary, but are not restrictive, of the invention.

BRIEF DESCRIPTION OF THE DRAWINGS

A more complete appreciation of the disclosure and many of the attendant advantages thereof will be readily obtained as the same becomes better understood by reference to the following detailed description when considered in connection with the accompanying drawings, wherein.

DESCRIPTION OF THE EMBODIMENTS

Figure 1:
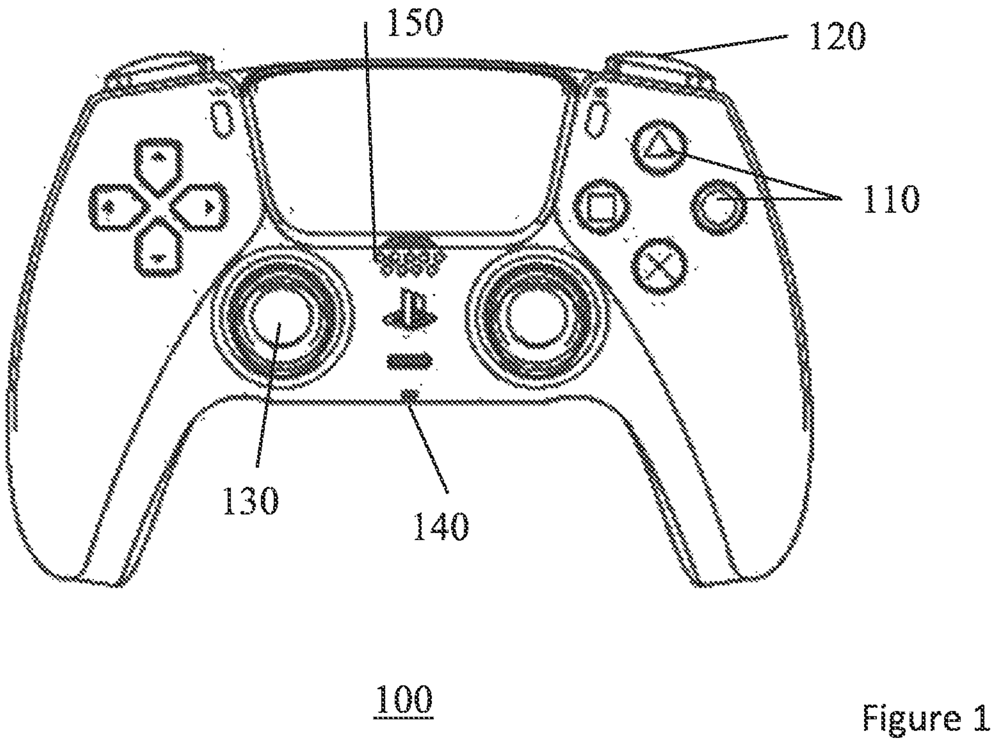
FIG. 1 schematically illustrates a handheld controller.

Referring now to the drawings, wherein like reference numerals designate identical or corresponding parts throughout the several views, embodiments of the present disclosure are described.

FIG. 1 schematically illustrates an example of a games controller 100 suitable for implementing a number of embodiments of the present disclosure.

The games controller 100 is configured to transmit one or more inputs, provided by a user of the controller 100, to a processing device (such as a games console). These inputs may comprise signals indicating the operation of one or more of the buttons 110, triggers 120, or joysticks 130. The controller 100 may also comprise one or more hardware motion detectors (such as accelerometers or gyroscopes) that are able to detect motion of the controller 100; the controller 100 may generate one or more inputs to the processing device to control the operation of the device (and/or one or more applications being executed by the device, such as a computer game). The controller 100 may further comprise one or both of a microphone 140 and a speaker 150; these enable sound input by a user and sound output to a user respectively.

The controller 100 may be further configured to receive inputs from an associated processing device, rather than just from the user. Examples of such inputs may include audio inputs (for output by a speaker associated with the controller) or haptic inputs that are used to control one or more haptic feedback elements such as a rumble feature.

In some embodiments, the controller 100 may comprise one or more processing units that are operable to perform functions at the controller 100; this may be advantageous in that this processing burden is not placed onto the associated processing device, and processing (such as input detection) can be performed with a lower latency due to not requiring signals to be transmitted to the processing device for processing.

Of course, any suitable configuration of a controller may be considered appropriate for use in embodiments of the present disclosure; the only requirements are that the device is operable to receive inputs from a user, and that operation of the controller causes sound to be generated.

Figure 2:
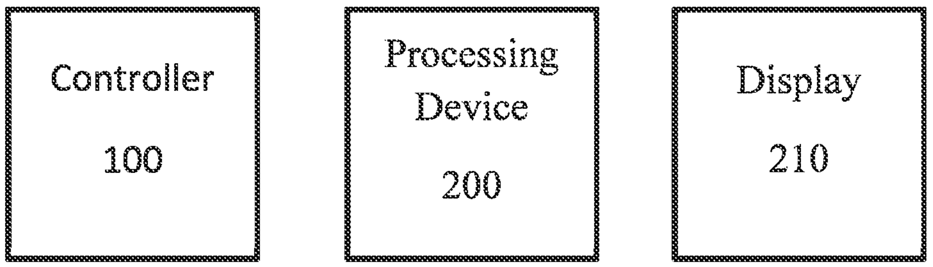
FIG. 2 schematically illustrates a processing system.

FIG. 2 schematically illustrates an example of a system in which such a controller may be used; this system comprises one or more controllers 100, a processing device 200, and a display 210. One example of a system according to FIG. 2 is that of a games console that is provided with a number of controllers for a user to provide inputs, and a display upon which to show gameplay to the users. Similarly, a personal computer may be provided as the processing device 200 rather than a games console; in such a case, the one or more controllers 100 may include a keyboard and/or a mouse or any other suitable input device.

While FIG. 2 shows that the elements of the system are separate, it is considered that in a number of embodiments they may be distributed amongst a number of devices smaller than the number of elements. A first example of this is the use of a laptop, in which a keyboard, processing unit, and display are each incorporated into a single physical unit—therefore each of the elements shown in FIG. 2 are incorporated into a single device in such an example. Similarly, handheld games consoles or mobile phones may be a further example. Mobile phones or tablets are often used with a separate games controller (via a wired or wireless connection); such arrangements are examples of an integrated processing device 200 and display 210 with a separate controller 100. In addition to such examples, it is also considered that a controller 100 and processing device 200 may be provided as a single unit with a separate display; examples of this include devices which offer a screen sharing or casting function that enables a display device to be selected freely. For instance, handheld game controllers (comprising processing elements) have been provided in the past that plug directly into a television to provide a gaming experience to a user.

In view of the above discussion it is apparent that while much of the discussion provided relates to games controllers of the type shown in FIG. 1 alongside a games console, the concepts taught are applicable to a much broader range of devices.

Figure 3:
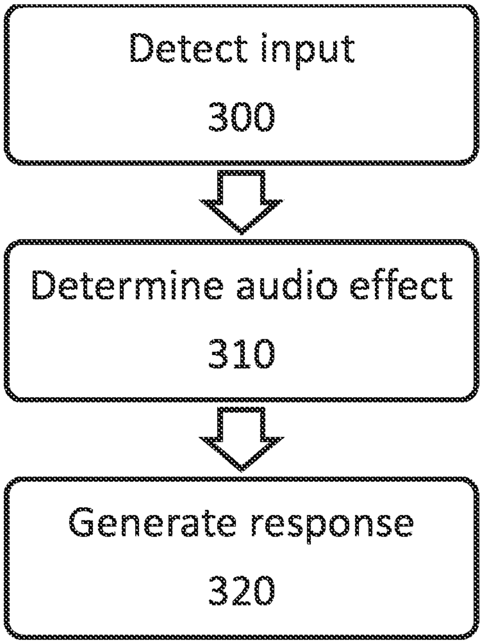
FIG. 3 schematically illustrates an audio mitigation method.

FIG. 3 schematically illustrates an example of a method according to one or more embodiments of the present disclosure. Such a method is used to mitigate the impact of the sound associated with inputs (such as button presses or haptic feedback) upon captured audio within the environment of the controller, for example using a microphone located on the controller or located at a processing device, or a separate microphone (such as a headset worn by a user of the controller). Such a method can therefore be used to mitigate the impact of button presses and the like upon captured audio, such as a commentary provided by a player of a game, audio inputs for controlling a processing device, or conversation between friends.

At a step 300, one or more inputs that are provided to a controller are detected. This may include inputs provided by a user, such as operation of one or more buttons (simultaneously or in succession), or inputs provided by an associated processing device such as audio inputs or haptic feedback generation inputs. This detection may be performed in a number of ways; in some embodiments that detection is performed based upon the detection of the operation of a button (or the like) by the controller, while in others the generation of a haptic feedback signal is detected at a processing device or the controller. Further examples of such a detection are discussed below.

At a step 310, an audio effect associated with the detected inputs is determined. This may be performed in any suitable way for the input—in some embodiments this may be performed by detecting a button press and using a look-up table or the like to identify a corresponding sound. Alternatively, or in addition, the sound of an input being provided may be detected using a microphone. A further alternative or additional example is that of determining audio associated with the implementation of a signal provided to the controller, such as determining audio that would result from generation of haptic feedback in accordance with a provided haptic feedback generation signal.

The determination of the audio effect may comprise the use of information about the propagation of the audio between the sound source and a microphone associated with the controller and/or user. For instance, a distance between the audio source and the microphone may lead to a notable difference in the audio level between the emitted and received sounds. Similarly, different propagation paths may lead to changes in pitch or volume, for instance; this can be caused by the structure of the controller itself in some cases, as audio conduction through plastic elements may lead to a significant difference between the emitted and received audio. Using information about the controller (such as the structure, materials, and location of input/output elements) or prior testing may therefore be useful in determining the audio effect associated with an input.

At a step 320 a response is generated that reduces the impact of the audio effect on audio captured by a microphone in the environment of the controller. In some embodiments this may comprise applying processing to a captured audio signal in dependence upon the determined audio effect so as to perform a noise cancelling function. Alternatively, or in addition, a speaker associated with the controller may be controlled to emit a signal that is received by the microphone, the signal being determined so as to provide a noise cancellation function in respect of the audio effect associated with the input.

In accordance with the method of FIG. 3, arrangements may be provided that enable a noise cancellation style process to be performed for audio generated through operation of a controller. Such arrangements are advantageous in that they leverage existing knowledge (such as the audio emitted by an input) to enable more efficient processing to reduce the impact of unwanted audio in a captured audio stream. Such arrangements may also be advantageous in that they are performed in association with an audio capture process rather than an audio playback process as in traditional noise cancellation—this can therefore be more efficient for audio reproduction, as well as leading to a higher quality of captured audio as the amount of unwanted noise can be reduced during the capture process.

As noted above, the identification of properties of the controller or the inputs themselves in advance can assist with providing an efficient implementation of methods according to the present disclosure. Such properties may be derived from modelling of a device (for example, considering the relative arrangement of elements such as buttons and microphones and the materials and/or shape of the controller), or from testing in which inputs are provided and the audio output associated with those inputs recorded. Such properties are advantageous in that it can be determined in advance how the expected (unwanted) sounds will sound in the captured audio.

It is envisaged that in many cases the emitted sound for an element is able to be determined in advance, which can enable a modelling process. For example, the different operation modes of a haptic feedback element may be known, and the materials and forces on different buttons and triggers may be determined. The use of a modelling process may be advantageous in the case that the audio impact is dependent upon the user that is using the controller or environmental factors—such as whether a stronger grip or larger hands dampens the transmission of audio through the controller, or whether using a keyboard generates different sounds in dependence upon the surface on which the keyboard rests (for example, a harder surface such as a desk may lead to a noisier use than a softer surface such as the user's legs).

In some cases, such an identification may be provided on a per-element basis—for example, information may be generated for operation of a particular button or trigger or a particular haptic feedback element. This may be suitable as the location of the particular element is fixed within the controller; therefore spatial components of the identification can be constant. Such an approach may be particularly suited when there are a large number of distinct inputs, which can lead to a large number of possible actions, as this can be a simplified manner for representing the identification information.

Alternatively, or in addition, the identification may be provided on a per-action basis; for instance, a particular operation of an input. An example of this may be a particular operation of a haptic feedback element (such as a specific rumble pattern defined by particular frequencies and amplitudes) or button (for example, a trigger with multiple input options may generate different sounds for a half-press action and a full-press action). Such an approach may be particularly suitable when considering embodiments in which the provision of an input is determined from signals generated for/by those inputs as the action can be easily derived in such cases.

Further alternative (or additional) methods of generating and storing identified properties may also be appropriate; the above examples should not be regarded as limiting upon this disclosure. For instance, an identification may be performed that identifies a spatial dependency for the audio effect with respect to a microphone position that is used to modify the expected impact on the captured audio.

Two exemplary methods for implementing embodiments of the present disclosure are described with reference to FIGS. 4 and 5; the former relates to the provision of user inputs (such as button presses) while the latter relates to the provision of inputs to the controller (such as haptic feedback or audio outputs). While there are differences in the respective methods, it is considered that each provides useful background for the other as there are significant similarities between the methods.

Figure 4:
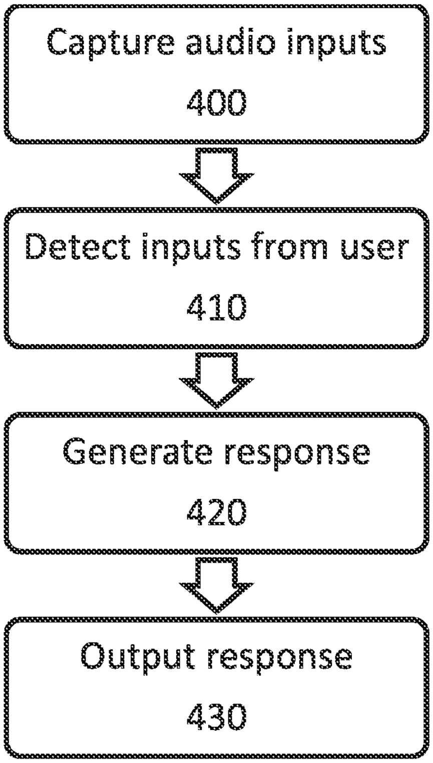
FIG. 4 schematically illustrates a method for generating a response to a detected input by a user.

FIG. 4 schematically illustrates a method for generating a response to a detected input by a user, the response being used to modify captured audio. The detected inputs may include operation of physical elements, such as buttons, keys, triggers, touchscreens, and/or trackpads.

At a step 400 one or more audio inputs are captured by a microphone associated with the controller. These audio inputs may include speech by the user of the controller, for example, although it is considered that any audio may be appropriate.

At a step 410 one or more inputs from a user to the controller are detected. This detection may be performed in any suitable manner; in a first example this may be performed through an audio detection in which the sound of an element being operated by a user to provide an input is detected. A second example is that of an analysis of signals output (or at least generated for output) by the controller in response to an input by a user so as to determine which inputs have been provided at a particular time.

A step 420 comprises the generation of a response to the detected input in dependence upon the input and at least a distance between an element associated with the input and the microphone. For instance, based upon the detection of a particular input the expected sound at the microphone due to that input may be identified—as discussed above, the audio impact of the providing of the input is also dependent upon at least a distance between the element associated with the input and the microphone as attenuation or conduction through a controller may be relevant factors. The response that is generated is dependent upon the desired method of modifying the audio data.

A step 430 comprises outputting the response generated in step 420. In some embodiments, this may comprise providing an audio signal to a speaker for output so as to mitigate the audio impact of the audio associated with the detected inputs from the user. In such a case the response may comprise an audio signal that is the inverse of the audio associated with the detected input, with one or more further modifications to account for the relative locations of the element associated with the input, the microphone, and/or the speaker for outputting the response.

Alternatively, or in addition, the outputting of the response may comprise providing information for modifying the captured audio directly so as to modify the captured audio to reduce the audio impact of the audio associated with the detected inputs from the user. For instance, a digital signal that is the inverse of the audio associated with the detected input may be generated or information about time, magnitude, and/or frequency that enables a more specific removal of the unwanted audio (that corresponding to the input by the user) from the captured audio.

Figure 5:
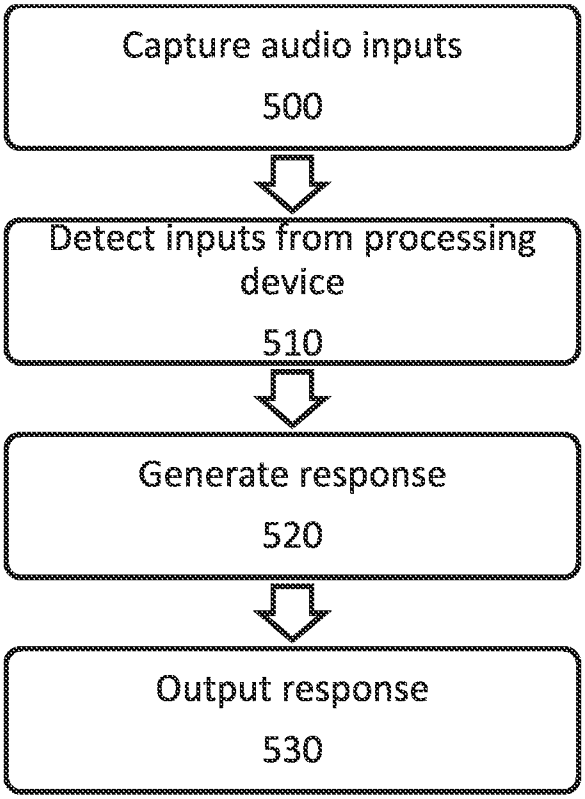
FIG. 5 schematically illustrates a method for generating a response to a detected input by a processing device.

FIG. 5 schematically illustrates a method for generating a response to a detected input by a processing device, the response being used to modify captured audio.

At a step 500 one or more audio inputs are captured by a microphone associated with the controller. These audio inputs may include speech by the user of the controller, for example, although it is considered that any audio may be appropriate.

At a step 510 one or more inputs from a processing device to the controller are detected. These inputs may comprise audio to be output by a speaker associated with the controller (such as sound effects corresponding to an in-game event) or signals controlling an operation of the controller (such as haptic feedback signals). These can be detected via a microphone or an analysis of data received from the processing device, similar to the detection discussed with reference to step 410 above.

A step 520 comprises the generation of a response to the detected input in dependence upon the input and at least a distance between an element (such as a speaker or haptic feedback element) associated with the corresponding output (that is, the output that is generated based upon the detected input) and the microphone. For instance, based upon the detection of a particular input the expected sound at the microphone due to that input may be identified—as discussed above, the audio impact of the providing of the input is also dependent upon at least a distance between the element associated with the input and the microphone as attenuation or conduction through a controller may be relevant factors. The response that is generated is dependent upon the desired method of modifying the audio data.

A step 530 comprises outputting the response generated in step 520. In some embodiments, this may comprise providing an audio signal to a speaker for output so as to mitigate the audio impact of the audio associated with the detected inputs from the processing device. In such a case the response may comprise an audio signal that is the inverse of the audio associated with the detected input, with one or more further modifications to account for the relative locations of the element associated with the input, the microphone, and/or the speaker for outputting the response.

Alternatively, or in addition, the outputting of the response may comprise providing information for modifying the captured audio directly so as to modify the captured audio to reduce the audio impact of the audio associated with the detected inputs from the processing device. For instance, a digital signal that is the inverse of the audio associated with the detected input may be generated or information about time, magnitude, and/or frequency that enables a more specific removal of the unwanted audio (that corresponding to the input by the processing device) from the captured audio.

In some embodiments, these inputs by the processing device can be determined in advance by the processing device; for instance, during a scripted scene within a game. In such cases, the response may be generated so as to be output alongside the input itself. Similarly, the processing device may be configured (for example, in dependence upon identification of a controller being used) to generate the response automatically at the time of generating the input. For example, a processing device may be configured to generate a haptic feedback signal and a response to mitigate the audio impact of the haptic feedback at the same time (or otherwise as a part of the same process). This can be advantageous in reducing the latency of the response generation process; particularly in the case in which the processing device implements the response.

While the discussion above has been primarily concerned with controllers with integrated microphones for capturing audio (such as a user's commentary), it is also considered that the microphone may be located in a separate device such as a headset. In such cases the distance between the controller (that is, the hardware generating audio from inputs) and the microphone may not be fixed. In such cases, the locations of the respective devices can be tracked and a determination of the variation on the audio impact can be determined accordingly—for instance, the magnitude of the audio impact may be reduced with increasing distance between the devices. Any suitable tracking method may be performed—for instance, camera-based tracking of both the controller and the headset (or the user's head, from which the location of a head-mounted microphone may be derived) can be performed.

Figure 6:
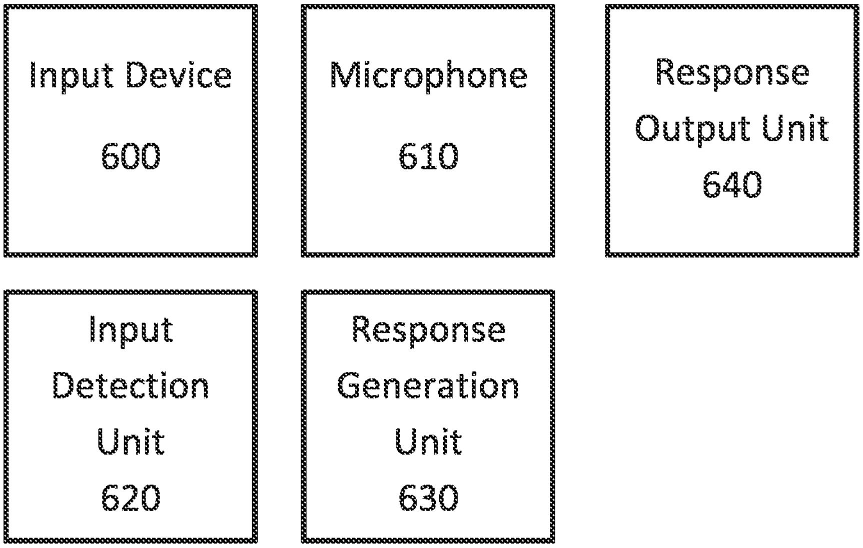
FIG. 6 schematically illustrates a system for implementing one or more embodiments of the present disclosure.

FIG. 6 schematically illustrates a system for implementing one or more embodiments of the present disclosure. This system comprises an input device 600, a microphone 610, an input detection unit 620, and a response generation unit 630. The input detection unit 620 and response generation unit 630 may be implemented using central processing units or the like located at one or more devices (such as the input device 600, an associated processing device, and/or a server). Further functional units may also be provided but are not shown for conciseness; for instance, storage means (such as a hard drive) for storing input device 600 parameters may be provided, and a processing unit for performing audio processing on the audio captured by the microphone 610 may be provided.

The input device 600 comprises one or more elements operable by a user to generate inputs to a processing device; this processing device may be an associated games console or the like, or a server in a cloud-based arrangement. The elements may comprise one or more of buttons, keys, switches, analogue sticks, touch inputs, and/or triggers, for example. In some embodiments the input device 600 may be formed as a game controller, keyboard, or touch screen device; discussion of the controller elsewhere in this document may therefore be considered to be applicable to embodiments of the input device 600 where appropriate. Alternatively, or in addition, the input device 600 may be provided in an integrated fashion with one or more other devices; for instance, a device comprising the input device 600, the processing device, and a display device operable to display an output of the processing device may be provided. Examples of this as discussed above include laptops, portable games consoles, and mobile phones.

The microphone 610 is operable to capture one or more audio inputs. In some embodiments, the microphone is provided as a part of the input device 600; alternatively, or in addition, the microphone 610 may be provided with separate hardware such as a headset worn by a user, integrated with a processing device, or as a standalone unit.

The input detection unit 620 is operable to detect one or more inputs to the input device 600 by the user. In some embodiments, the input detection unit 620 is operable to detect inputs using captured audio as discussed with reference to step 410 of FIG. 4. This captured audio may be audio captured by the microphone 610, or it may be audio captured using an alternative microphone. Alternatively, or in addition, the input detection unit 620 is operable to detect inputs in dependence upon control signals generated by the input device 600 in response to the user input.

The response generation unit 630 is operable to generate a response to the detected input in dependence upon the input and at least a distance between an element associated with the input and the microphone. The response generation unit 630 may be implemented by a processing unit located at either (or both of) the input device 600 and the associated processing device (or the like). This response may be a signal that is the inverse of the audio associated with the detected input, with one or more additional modifications where appropriate to account for additional acoustic effects.

In some embodiments the response generation unit 630 is operable to generate an audio response for output by a speaker associated with the input device 600. Alternatively, or in addition, the response generation unit 630 may be operable to generate a response for output to an audio processing unit operable to modify audio inputs captured by the microphone 610. Examples of this response generation are discussed above with reference to steps 420 and 430 of FIG. 4.

The response generation unit 630 may be operable to generate a response in dependence upon one or more physical properties of the input device 600, rather than only the distance between the element associated with the input and the microphone 610 (and/or other factors). Examples of the physical properties include one or more of the size, shape, structure, material, and/or sound conductivity of the input device 600; these properties may be used to infer or calculate the difference between audio emitted by an element during the input process and the audio detected by the microphone 610, as these properties influence the audio propagation through the input device 600. Such properties may be relevant even if the microphone 610 is not integrated with the input device 600, as the audio generated by the user input may still be affected by these properties. This may be particularly true of rear triggers on a controller, for example, when the user wears a headset microphone; the sound from the triggers still propagates through the controller to reach the microphone.

An alternative or additional option may be that of the response generation unit 630 being operable to generate a response in dependence upon one or more operational parameters of the input device 600, including parameters indicating how the input device 600 is held by the user. For example, pressure sensors on the input device 600 may be used to infer the force with which the input device 600 is held or the size of the user's hands. Other operational parameters may include information about a surface upon which the input device 600 is placed during use. Operational parameters may be determined using images of the arrangement or audio cues (for instance, determining a difference between expected and received audio from operation of the input device 600 due to these parameters), and can be used to modify the expected audio impact upon the audio captured by the microphone 610.

In some embodiments the response generation unit 630 may be configured to generate a response using one or more transfer functions defined for the input device and/or one or more elements of the input device (such as individual buttons). These may be generated based upon information about the structure and arrangement of elements within a controller, for instance, or may be generated based upon an analysis of the propagation of sound throughout the controller. For example, this latter generation may be performed by providing a standardised sound and comparing the response measured at the microphone with information about the sound; the standardised sound may be pre-recorded audio, for example, or may be derived based upon information about the operation of a button (for instance, some buttons can detect how hard they are pressed, which can be used to determine an expected sound of pressing the button). Based upon this comparison, information such as a time delay, attenuation, and/or changes in frequency or frequency profile can be identified.

In some cases, these transfer functions may also be defined in dependence upon information about the user's grip on the controller or other information about the location of the input device (such as if it is placed upon a hard surface or soft surface) that can have an effect on the propagation of sound throughout the input device. This can be determined based upon measurements of the grip (for instance, using pressure sensors on the input device or inferring a strong grip through hard button presses or the like) and using this to predict or estimate a change in the sound propagation, for instance. Similarly, spatial tracking of the input device can be used to determine if the input device is resting on a particular surface in the environment (with identification of the surface providing information about its hardness or other properties).

While discussed above in the context of determining what audio would be picked up by the microphone, in some cases it may be considered useful to instead (or additionally) determine transfer functions that represent the audio that would be heard by the user when operating the input device. Such a transfer function would be expected to be dependent upon a relative position of the input device and the user's head (or more specifically, ears). Further consideration may also be made for attenuation or the like due to the user wearing headphones or the like. These transfer functions may be defined for each (or at least a selection of) input element, groups of input elements (such as all shoulder buttons on a controller), or it may be considered sufficient to define a transfer function for the input device itself (this may be used in conjunction with transfer functions for input elements, in some embodiments).

In such embodiments, an optional transfer function identification unit may be provided which is operable to identify a transfer function in dependence upon at least one property of the input device and a distance between an element associated with the corresponding input and the microphone. Alternatively, a pre-existing transfer function may be selected in dependence upon an identified input provided to the processing device from the input device—for instance, selecting a transfer function associated with a particular button or input key that has been operated by a user. In this case, the response generation unit may be operable to generate a response to the detected input in dependence upon the input and the identified transfer function without explicitly utilising the distance between an element associated with the input and the microphone.

The response output unit 640 is operable to output the response generated by the response generation unit 630. The response output unit 640 may be configured as appropriate for a particular embodiment; for example, in some cases the response output unit 640 may be implemented as a processing unit and a speaker for generating audio outputs as responses. Alternatively, the response output unit 640 may be implemented as a processor that provides a signal to an audio processing unit for modifying audio captured by the microphone 610. In some embodiments, the response output unit 640 may comprise each of these features so as to be able to output either type of response as appropriate. For instance, in some embodiments it may be considered that an audio output is more appropriate for some inputs while audio processing is more appropriate for others. This may be determined on a per-input basis as appropriate for a particular input device 600, for instance.

The arrangement of FIG. 6 is an example of a processor (for example, a GPU and/or CPU located in a games console or any other computing device) for use with a system comprising an input device comprising one or more elements operable by a user to generate inputs to a processing device and a microphone operable to capture one or more audio inputs. The processor is operable to: detect one or more inputs to the input device by the user; and generate a response to the detected input in dependence upon the input and at least a distance between an element associated with the input and the microphone.

Figure 7:
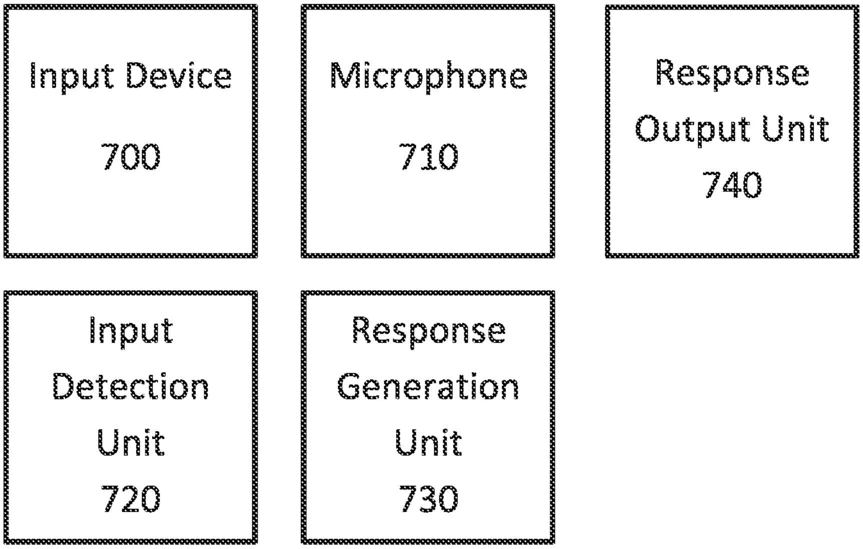
FIG. 7 schematically illustrates a system for implementing one or more embodiments of the present disclosure.

FIG. 7 schematically illustrates a system for implementing one or more embodiments of the present disclosure. This system comprises a feedback device 700, a microphone 710, an input detection unit 720, and a response generation unit 730. The input detection unit 720 and response generation unit 730 may be implemented using central processing units or the like located at one or more devices (such as the feedback device 700, an associated processing device, and/ or a server). Further functional units may also be provided but are not shown for conciseness; for instance, storage means (such as a hard drive) for storing feedback device 700 parameters may be provided, and a processing unit for performing audio processing on the audio captured by the microphone 710 may be provided.

The feedback device 700 comprises one or more elements operable to generate an output in response to an input from a processing device; examples of these outputs include audio outputs (via a speaker associated with the input device 700) and haptic feedback via haptic feedback units (such as rumble generators). In accordance with the discussion above, the feedback device 700 may be embodied as a games controller or the like; however it is not required that the feedback device 700 is configured so as to enable user inputs. In other words, the only requirement is that the feedback device 700 is operable to generate an output in response to an input from a processing device. Examples of suitable feedback devices include those which provide haptic feedback via a rumble motor or the like—the feedback device 700 may therefore be embodied as a head-mountable display which provides haptic feedback, for example, or another wearable device (such as a vest that is able to simulate impacts, or a wristband that simulates weight using torque generation) that provides outputs with limited user input functionality.

The microphone 710 is operable to capture one or more audio inputs. In some embodiments, the microphone is provided as a part of the feedback device 700; alternatively, or in addition, the microphone 710 may be provided with separate hardware such as a headset worn by a user, integrated with a processing device, or as a standalone unit.

The input detection unit 720 is operable to detect one or more inputs to the feedback device 700 from the processing device. In some embodiments the input detection unit 720 is operable to detect inputs using captured audio indicating a corresponding output; that is, an input can be detected from captured audio that comprises audio of an output that is generated in response to the input. For instance, if audio comprises the sound of a rumble then it can be inferred that a haptic feedback signal was provided to the feedback device 700.

Alternatively, or in addition, the input detection unit 720 may be operable to detect inputs in dependence upon control signals in the input provided to the feedback device 700 by the processing device. Such a detection may comprise the analysis of incoming signals to the feedback device 700 to determine which output is instructed; alternatively, or in addition, this may comprise an analysis of the control signals as a part of the generation process.

The response generation unit 730 is operable to generate a response to the detected input in dependence upon the input and at least a distance between an element associated with the corresponding output and the microphone. The response generation unit 730 may be implemented by a processing unit located at either (or both of) the feedback device 700 and the associated processing device (or the like). This response may be a signal that is the inverse of the expected output associated with the detected input, with one or more additional modifications where appropriate to account for additional acoustic effects.

In some embodiments the response generation unit 730 is operable to generate an audio response for output by a speaker associated with the feedback device 700. Alternatively, or in addition, the response generation unit 730 may be operable to generate a response for output to an audio processing unit operable to modify audio inputs captured by the microphone 710. Examples of this response generation are discussed above with reference to steps 520 and 530 of FIG. 5.

The response generation unit 730 may be operable to generate a response in dependence upon one or more physical properties of the feedback device 700, rather than only the distance between the element associated with the input and the microphone 710 (and/or other factors). Examples of the physical properties include one or more of the size, shape, structure, material, and/or sound conductivity of the feedback device 700; these properties may be used to infer or calculate the difference between audio emitted by an element during the input process and the audio detected by the microphone 710, as these properties influence the audio propagation through the feedback device 700. Such properties may be relevant even if the microphone 710 is not integrated with the feedback device 700, as the audio generated by the user input may still be affected by these properties. This may be particularly true of rear triggers on a controller, for example, when the user wears a headset microphone; the sound from the triggers still propagates through the controller to reach the microphone.

An alternative or additional option may be that of the response generation unit 730 being operable to generate a response in dependence upon one or more operational parameters of the feedback device 700, including parameters indicating how the feedback device 700 is held by the user. For example, pressure sensors on the feedback device 700 may be used to infer the force with which the feedback device 700 is held or the size of the user's hands. Other operational parameters may include information about a surface upon which the feedback device 700 is placed during use. Operational parameters may be determined using images of the arrangement or audio cues (for instance, determining a difference between expected and received audio from operation of the feedback device 700 due to these parameters), and can be used to modify the expected audio impact upon the audio captured by the microphone 710.

In some embodiments the response generation unit 730 may be configured to generate a response using one or more transfer functions defined for the feedback device 700 and/or one or more output elements of the feedback device 700 (such as particular haptic feedback elements). These may be generated based upon information about the structure and arrangement of elements within a controller, for instance, or may be generated based upon an analysis of the propagation of sound throughout the controller. For example, this latter generation may be performed by providing a standardised sound and comparing the response measured at the microphone with information about the sound; the standardised sound may be haptic feedback with a known duration, frequency, intensity, and/or timing, for example. Based upon this comparison, information such as a time delay, attenuation, and/or changes in frequency or frequency profile can be identified.

In some cases, these transfer functions may also be defined in dependence upon information about the user's grip on the controller or other information about the location of the feedback device (such as if it is placed upon a hard surface or soft surface) that can have an effect on the propagation of sound throughout the feedback device. This can be determined based upon measurements of the grip (for instance, using pressure sensors on the input device or inferring a strong grip through hard button presses or the like) and using this to predict or estimate a change in the sound propagation, for instance. Similarly, spatial tracking of the feedback device can be used to determine if the feedback device is resting on a particular surface in the environment (with identification of the surface providing information about its hardness or other properties).

While discussed above in the context of determining what audio would be picked up by the microphone, in some cases it may be considered useful to instead (or additionally) determine transfer functions that represent the audio that would be heard by the user when operating the feedback device. Such a transfer function would be expected to be dependent upon a relative position of the feedback device and the user's head (or more specifically, ears). Further consideration may also be made for attenuation or the like due to the user wearing headphones or the like. These transfer functions may be defined for each (or at least a selection of) output element, groups of output elements (such as all vibrating elements on a controller), or it may be considered sufficient to define a transfer function for the feedback device itself (this may be used in conjunction with transfer functions for output elements, in some embodiments). In some cases, it may be possible to use transfer functions and/or other information about the output to determine the overall audio impact upon the microphone or user. For instance, in some cases it may be considered that the outputs generated by respective output elements of the feedback device (such as a number of respective vibrations generated by motors in a controller) generate interference with one another. This interference can be constructive (thereby increasing the overall audio impact), destructive (reducing the overall audio impact, or in some cases eliminating it entirely), or a combination of the two such that some parts of the output (such as particular vibration frequencies) are enhanced while others are diminished. It is therefore considered that if the estimated overall audio impact of the output elements for particular respective outputs falls below a threshold value, no response need be generated.

In such embodiments, an optional transfer function identification unit may be provided which is operable to identify a transfer function in dependence upon at least one property of the feedback device and a distance between an element associated with the corresponding output and the microphone. Alternatively, a pre-existing transfer function may be selected in dependence upon an identified input provided to the feedback device from the processing device—for instance, selecting a transfer function associated with a particular vibrating element. In this case, the response generation unit may be operable to generate a response to the detected input in dependence upon the input and the identified transfer function without explicitly utilising the distance between an element associated with the corresponding output and the microphone.

In some embodiments the input detection unit 720 is provided at the processing device and is operable to detect inputs before they are provided to the feedback device 700; in such cases the response (generated by the response generation unit 730) to the detected input may be provided to the feedback device 700 in association with the detected input.

The response output unit 740 is operable to output the response generated by the response generation unit 730. The response output unit 740 may be configured as appropriate for a particular embodiment; for example, in some cases the response output unit 740 may be implemented as a processing unit and a speaker for generating audio outputs as responses. Alternatively, the response output unit 740 may be implemented as a processor that provides a signal to an audio processing unit for modifying audio captured by the microphone 610. In some embodiments, the response output unit 740 may comprise each of these features so as to be able to output either type of response as appropriate. For instance, in some embodiments it may be considered that an audio output is more appropriate for some inputs while audio processing is more appropriate for others. This may be determined on a per-input basis as appropriate for a particular feedback device 700, for instance.

The arrangement of FIG. 7 is an example of a processor (for example, a GPU and/or CPU located in a games console or any other computing device) for use with a system comprising a feedback device comprising one or more elements operable to generate an output in response to an input from a processing device, and a microphone operable to capture one or more audio inputs. The processor is operable to: detect one or more inputs to the feedback device from the processing device; and generate a response to the detected input in dependence upon the input and at least a distance between an element associated with the corresponding output and the microphone.

Figure 8:
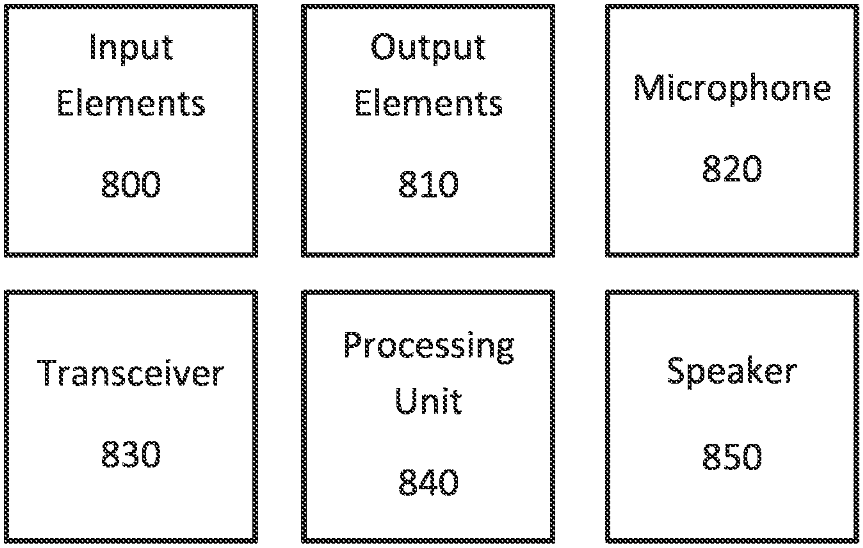
FIG. 8 schematically illustrates an input device according to one or more embodiments of this disclosure.

FIG. 8 schematically illustrates an input device according to one or more embodiments of this disclosure; the input device of FIG. 8 may function as the controller 200 of FIG. 2, for example. The input device 600 and feedback device 700 of FIGS. 6 and 7 may be implemented in accordance with the example of FIG. 8, with any one or more of the elements being considered optional as appropriate; for instance, the output elements 810 may be omitted if no haptic feedback or audio output is desired and/or the processing unit 840 may be omitted if the processing functions are to be performed by an associated processing device such as a games console. Similarly, the input elements 800 may be omitted in embodiments in which no user input is envisaged (that is, in the case of a feedback-only device).

The input elements 800 comprise any features that can be operated by a user in order to provide an input to a process such as a computer program or a game. Examples of suitable input elements include buttons, keys, switches, analogue sticks, touch inputs, and/or triggers. Additional (or alternative) input elements may be provided to enable additional functionality; for instance, trackable indicators (such as coloured lights), inside-out tracking cameras, and/or hardware motion detectors such as accelerometers and gyroscopes may be provided to enable a user to provide motion inputs. Similarly, a microphone may be provided as an input element to enable voice commands to be provided by a user.

The output elements 810 comprise any suitable elements for providing feedback to the user in dependence upon signals generated by a processing device. Examples of suitable elements include haptic feedback elements, such as vibration or rumble units, and speakers operable to provide audio feedback to a user.

The microphone 820 may include one or more microphones that are associated with the input device. A single microphone that may be provided that captures audio for output, such as voice communication by a user. This same microphone may be used for detection of inputs/outputs as discussed with reference to FIGS. 4 and 5. In a number of embodiments multiple microphones may be provided. For instance, multiple microphones can be provided for capturing audio for output so as to increase the accuracy of the localisation of the sound source. Alternatively, or in addition, further microphones can be provided that are for the sole purpose of detecting inputs/outputs; these microphones may be of a lower quality than those for capturing audio for output (such as operating over a reduced frequency range, or generating a noisier signal) where appropriate.

The transceiver 830 (or alternatively, a separate transmitter and receiver) can be provided to facilitate communications between the input device and an external processing device. Such a feature may be omitted when the input device is integrated with the processing device (such as for a laptop or handheld games console). This unit 830 is operable to transmit and receive communications via a wired or wireless communication protocol to enable the transfer of inputs and outputs between the input device and an associated processing device.

The processing unit 840 is provided so as to be able to perform any suitable processing at the input device; this unit 840 may be used to perform the input detection and/or response generation process in some embodiments, for example. This processing unit 840 may also be operable to perform audio modification processing where appropriate; for example, to apply a response to generated audio. Such a unit 840 (or at least a selection of its functionality) may instead be implemented by an associated processing device in some embodiments.

The speaker 850 may comprise one or more speakers operable to provide audio outputs. In some embodiments a single speaker may be provided that provides audio (such as game audio or voice communication audio) to a user, and this speaker may be repurposed as desired to generate audio signals for mitigating the audio impact of inputs by the user or the processing device. Alternatively, multiple speakers may be provided for the purpose of providing surround sound and/or dedicated speakers for generating the mitigating audio output. As with the microphone 820 discussed above, a lower-quality speaker may be provided where appropriate; for example, one having a lower frequency range or a lower quality sound output for the mitigating audio output.

While only the use of a single input device in a system has been discussed above, it is also considered that arrangements in which multiple such devices can be provided may be suitable for such processing. Each of the input devices may be subject to further processing so as to mitigate the audio impact of sounds generated by one or more of the other input devices in the system. This may enable the advantages of the present disclosure to be extended effectively to multiplayer arrangements, or arrangements in which a single user is provided with multiple input devices.

In such arrangements it is considered that operation information for each of the input devices can be generated independently (such as information regarding inputs by a user and/or inputs from the processing device to the respective input devices) and shared amongst the input devices in the case in which the audio impact mitigation processing is performed by each input device. Alternatively, or in addition, processing may be performed by a common processing device (such as a games console with which each of the input devices is associated) so as to reduce the amount of information needing to be transmitted. Further information that may be useful is that of the distance between each of the input devices; this can be acquired through camera-based tracking solutions or a proximity detection, for example. Such processing may be implemented on a threshold basis, such that input devices more than a threshold distance from one another may be considered to have a negligible (or no) impact on one another. The threshold distance may be determined for individual inputs/outputs as appropriate, in accordance with the fact that each may be associated with a different volume or audio impact.

It is further noted that the teachings of the present disclosure do not require a microphone to be capturing audio in order to provide advantages to a user. It is also considered that such noise cancellation (or mitigation) may be desirable for a user's own benefit—in other words, audio may be output by the audio device so as to mitigate the impact of inputs/outputs where appropriate. For instance, the sound associated with haptic feedback may be mitigated using techniques described above, which can enable a user to benefit from the advantages of the feedback without experiencing such significant disruption from the associated sounds.

As discussed above, the audio cancellation processes may utilise a transfer function in order to more precisely identify the audio impact of the operation of a particular input or output on audio recorded by a microphone. A transfer function may be used to represent the difference between the initial sound (such as a button press or rumble) and the sound that would be captured by a particular microphone. For instance, a vibration at a particular frequency may cause a secondary vibration at a different frequency within the input device due to resonance of the shell of the input device, or the volume may vary due to distance between the input/output element (such as a button or haptic feedback element).

The use of a transfer function which represents such considerations can therefore enable an improved processing of the captured audio to remove or mitigate the audio impact, for example, or a more effective generation of an inverse haptic signal to mitigate the audio impact of a haptic feedback element. Therefore, while such a transfer function is not considered to be essential, in a number of embodiments of the present disclosure it may nevertheless be considered desirable.

Figure 9:
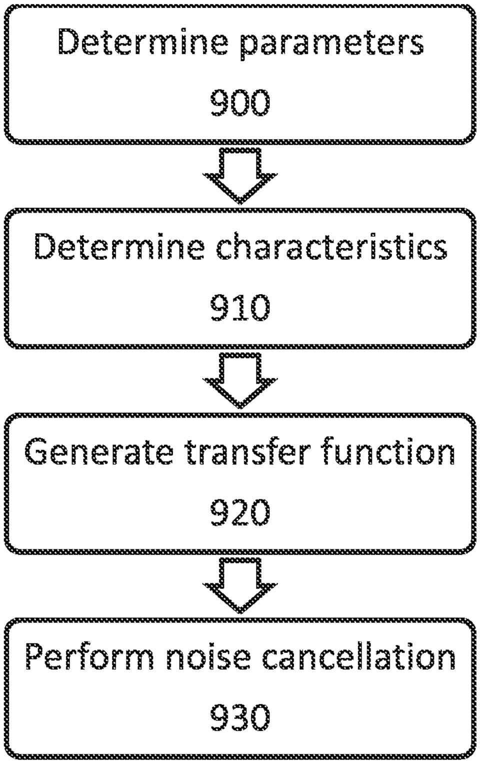
FIG. 9 schematically illustrates a method for generating a transfer function.

FIG. 9 schematically illustrates a method for generating such a transfer function. This is discussed in the context of a generic input device; as discussed above this may be a controller for use with a games console, a keyboard, an integrated input device (such as portable games console or laptop input devices), or any other device for providing inputs to a processing device to control the operation of that device. This input device may correspond to either of the input device and feedback device discussed above, and may comprise both input and output elements so as to function as both of these. The method described below is exemplary, rather than limiting, and as such it is considered that any suitable method for generating a transfer function may be appropriate in embodiments of the present disclosure.

For instance, one alternative method for generating a transfer function (as discussed above) is that of providing standardised stimuli (such as predefined haptic feedback, or button presses of a known pressure/duration) and determining the difference between the audio impact of a stimulus at the microphone and the expected (known) audio impact at the source of the stimulus. This is effectively a comparison of the output (generated) audio and the captured audio. While effective, this may be considered inefficient as it may be necessary to perform a vast number of measurements in order to provide a satisfactory set of transfer functions (or a single transfer function) that can represent a sufficiently broad range of operational and structural parameters.

Turning to the method of FIG. 9, a step 900 comprises determining one or more parameters of the input device, wherein the parameters include a location of a microphone associated with the input device and a location of one or more respective input and/or output elements associated with the input device. These parameters are considered to be properties of the input device and its constituent elements, as well as information about how the input device is being used, as these as factors that can modify the transmission of audio and vibrations throughout the input device.

Examples of other parameters include the location of the input device in the environment, the motion of the input device, the identification of a surface upon which the input device is placed, whether an input device is held by a user (and if so, which hands are used and how strongly the user grips the input device), the shape and/or structure of the input device, the mass of the device, operation parameters of inputs/output (such as how a particular button works), and switch type (in other words, how a button is implemented). Any modifications to a controller may also be considered (functional or decorative, such as replacing buttons with alternatives or adding elements to modify the appearance of the device), as well as the attachment of peripherals (such as a plugged-in keyboard or headset) which may change how the audio/vibrations are transmitted throughout the input device.

The parameters may be determined in any suitable manner. For instance, while some parameters may be input by a user, others may be available from a database of information about particular input devices. Alternatively, or in addition, some parameters may be identified (such as respective button locations, or the location of the input device) based upon images captured of the input device. In some cases, an identification of the materials used to construct the input device may also be considered based upon any suitable techniques, such as from images, audio properties, or a determination of the density of the input device. Data from any suitable sensors, such as cameras, microphones, and inertial sensors, may be used to determine parameters.

In some cases, rather than a direct detection it is suitable to infer parameters of the input device and/or its use. For instance, rather than explicitly determining a surface upon which the input device is resting, it may be sufficient to determine that the device is unmoving and in a particular resting orientation (such as flat, or stood on end). This determination can be considered indicative of the input device being on a hard surface, as if it were held it would not be unmoving and if it were on a softer surface then it could be expected that the input device was at a different orientation (such as at a slant) as it may sink into the surface in an uneven manner. Similarly, it may be possible to determine which hand (or hands) a user is using to operate the input device based upon patterns in the detected motion of the input device—it is not considered necessary to analyse images to identify the user's hands on the input device, or to require a user to provide an indication of how they are holding the input device.

A step 910 comprises determining one or more characteristics of audio transmission between respective input and/or output elements and the microphone, wherein the characteristics include one or more of an attenuation, resonance, and/or change in frequency profile of audio associated with the respective input and/or output element. Audio transmission here may be considered to refer to audio or vibration from any input and/or output element—including both sounds of operating buttons or the like and the provision of haptic feedback through vibrating elements, for example. This determination may be performed by modelling the propagation of audio/vibrations throughout the input device, for instance; a model may be generated based upon the specific parameters as determined in step 900, or an existing model may be adapted in accordance with the parameters determined in step 900.

In some embodiments, this step may comprise the determination of the impact of one or more parameters upon audio transmission rather than a complete calculation of audio transmission characteristics. For instance, an attenuation factor may be calculated for a sound associated with a particular input or output element, or the frequency of a resonant output may be determined. Such information can be used to adapt an existing transfer function or as inputs for the generation of a new transfer function.

A step 920 comprises generating a transfer function (or a plurality of transfer functions) in dependence upon the determined audio characteristics. As indicated above, this may include the generation of an entirely new transfer function or the modification of an existing transfer function. For instance, a 'base' transfer function for the input device that is defined by a manufacturer of the input device may be modified in dependence upon information about how the input device is being held (an example of a parameter) and the effect of this upon the audio transmission (an example of a characteristic). Once generated, the transfer function may be stored for future use; alternatively, a new transfer function may be generated with any degree of regularity (such as each play session, after a predetermined amount of time, after an above-threshold change in one or more parameters) as is considered appropriate for a given implementation.

Transfer functions may be defined in any suitable combination for a given input device. In some embodiments, a single transfer function may be defined for the input device as a whole which indicates general properties of the audio transmission characteristics—this may be particularly suitable for input devices with a simple structure and an arrangement of inputs that means little variation in the audio impact generated during use. Alternatively, transfer functions may be defined for each microphone associated with the input device and/or for each input/output element associated with the input device; in this manner, a separate transfer function could be identified for each microphone/input or output pair identified at the input device.

An optional step 930 comprises performing a noise cancellation process for audio corresponding to one or more inputs and/or outputs of the input device in dependence upon the generated transfer function; such a step is optional, as the generation of the transfer function or functions in step 920 may be performed as part of a calibration process or the like that seeks to establish a number of transfer functions for use before they are required. This noise cancellation process may be performed in accordance with either of the methods described with reference to FIGS. 4 and 5, for example, in which the response is generated in dependence upon the transfer function(s) generated in step 920. In other words, the noise cancellation process comprises the generation of output audio and/or the modification of captured audio comprising audio corresponding to one or more inputs and/or outputs of the input device.

In the case that multiple transfer functions are associated with an input device, it is considered that an appropriate transfer function may be selected in dependence upon the input or output that is identified as corresponding to a particular sound. For instance, the operation of a particular button of the input device can be identified and a corresponding transfer function for that button may be selected.

Figure 10:
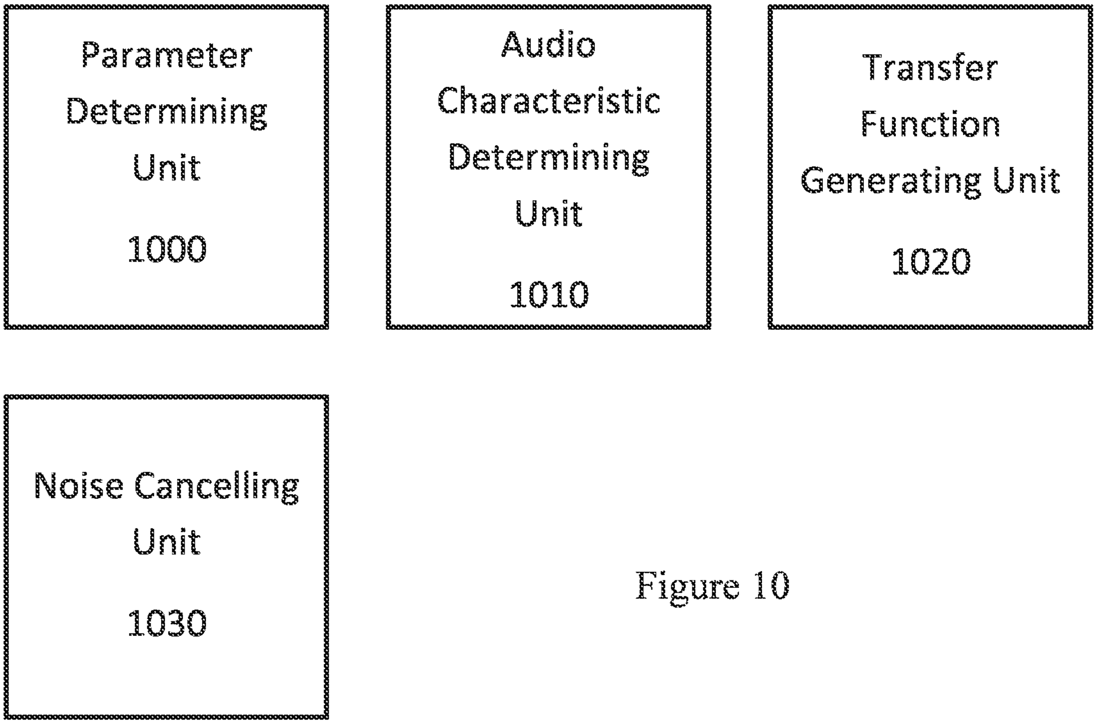
FIG. 10 schematically illustrates a system for generating a transfer function.

FIG. 10 schematically illustrates a system for generating a transfer function indicating audio transmission characteristics of an input device associated with a processing device. The input device may include any number of input and/or output elements; the input elements may include one or more buttons, keys, triggers, joysticks, and/or touchpads operable by a user of the input device, while the output elements may include one or more haptic feedback units and/or speakers configured to provide an output to a user of the input device.

The system includes a parameter determining unit 1000, an audio characteristic determining unit 1010, a transfer function generating unit 1020, and a noise cancelling unit 1030. This arrangement, which can be implemented using any suitable processing units (such as CPUs and/or GPUs) associated with any suitable device or devices; for example, a processor located at a games console with which the input device is associated may be used to implement the functionality described below. The system of FIG. 10 is configured to perform a method in accordance with that discussed above with reference to FIG. 9.

The parameter determining unit 1000 is configured to determine one or more parameters of the input device, wherein the parameters include a location of a microphone associated with the input device and a location of one or more respective input and/or output elements associated with the input device. The parameter determining unit 1000 may be configured to determine the properties of audio associated with each of the input and/or output elements for which a location is determined; for instance, this may include determining a sound or range of sounds associated with the operation of a particular input (such as the sound of pressing a button) or the characteristic frequencies or frequency ranges/profiles of a particular output (such as the frequencies associated with a haptic feedback element).

In some embodiments, the parameter determining unit 1000 is configured to determine parameters based upon a model of the input device, images captured of that input device, and/or information captured during operation of the input device by a user. A model of the input device may include any suitable information about the device—for instance, a shape, size, arrangement of elements, material information, weight, and any other information that may be considered relevant to audio generated by the device or its operation and how that audio is propagated throughout the input device. Images may be used to derive such information (for instance, by using images to determine a size and material used for the input device).

Information captured during operation of the input device by a user may include audio captured by the microphone associated with the input device (or another microphone), which can be compared to expected audio so as to derive one or more parameters associated with the audio propagation. Additional information may include a strength of grip, how the user holds an input device (such as number of hands, and how they are arranged on the input device), the motion of the input device, and information about any other factors that may affect the propagation of audio through the input device.

The audio characteristic determining unit 1010 is configured to determine one or more characteristics of audio transmission between respective input and/or output elements and the microphone, wherein the characteristics include one or more of an attenuation, resonance, and/or change in frequency profile of audio associated with the respective input and/or output element. The audio characteristic determining unit 1010 may be configured to determine parameters based upon a model of the input device and/or information captured during operation of the input device by a user; this may be the same model and/or information captured as described above with reference to the parameter determining unit 1010.

In embodiments in which the parameter determining unit 1000 is configured to determine the location and/or motion of the input device as a parameter, it is considered that the audio characteristic determining unit 1010 may be configured to determine one or more characteristics of audio transmission in dependence upon the location and/or motion of the input device. Similarly, in embodiments in which the parameter determining unit 1000 is configured to determine how the input device is held by a user of the device as a parameter, it is considered that the audio characteristic determining unit 1010 may be configured to determine one or more characteristics of audio transmission in dependence upon how the input device is held by the user.

The transfer function generating unit 1020 is configured to generate a transfer function in dependence upon the determined audio characteristics. In some embodiments, the transfer function generating unit 1020 is configured to generate respective transfer functions for each microphone associated with the input device. Alternatively, or in addition, the transfer function generating unit 1020 may be configured to generate respective transfer functions for each of a plurality of the input and/or output elements associated with the input device.

The noise cancelling unit 1030 is configured to perform a noise cancellation process for audio corresponding to one or more inputs and/or outputs of the input device in dependence upon the generated transfer function. This noise cancellation may be performed in accordance with any of the techniques described above; for instance, those discussed with reference to FIGS. 4 and 5. The noise cancellation process may comprise the generation of output audio (or vibration) and/or the modification of captured audio comprising audio corresponding to one or more inputs and/or outputs of the input device. These respectively represent the output of an inverse signal to mitigate the audio impact, and the processing of the captured audio to mitigate the audio impact.

In some embodiments, the transfer function generation process may be used to generate a transfer function for an input device with additional transfer functions being generated (or otherwise obtained) which represent the variation in audio propagation due to factors external to the input device—such as the surface on which the input device rests, or how the input device is held. In such embodiments, the noise cancelling unit 1030 may be configured to select two or more transfer functions, and to combine these (or apply them successively) in order to obtain a more accurate representation of the audio impact associated with a particular sound.

It is also considered that the noise cancellation process is not limited to cancellation of audio generated at the input device itself. For instance, a transfer function may be generated for an input device that is indicative of audio propagation of a sound outside of the input device. This can be used to estimate the audio impact on a microphone external to the input device (such as at a second input device, for instance another player's controller or a second device operated by the same user); this information may be used to enable an inter-device noise cancellation in which a more accurate noise cancellation for external sound sources (such as other input devices) can be realised.

The arrangement of FIG. 10 is an example of a processor (for example, a GPU and/or CPU located in a games console or any other computing device) that is operable to generate a transfer function indicating audio transmission characteristics of an input device associated with a processing device and to perform a noise cancellation process, and in particular is operable to: determine one or more parameters of the input device, wherein the parameters include a location of a microphone associated with the input device and a location of one or more respective input and/or output elements associated with the input device; determine one or more characteristics of audio transmission between respective input and/or output elements and the microphone, wherein the characteristics include one or more of an attenuation, resonance, and/or change in frequency profile of audio associated with the respective input and/or output element; and generate a transfer function in dependence upon the determined audio characteristics; and perform a noise cancellation process for audio corresponding to one or more inputs and/or outputs of the input device in dependence upon the generated transfer function.

While the systems and methods described above are able to provide an advantageous noise cancellation effect, it is considered that further improvements are able to be realised through the use of multiple audio output units for outputting cancellation signals. In particular, the following discussion relates to methods and arrangements in which two or more audio output units, having different characteristics and being provided in different devices, are each used to perform such a cancellation process.

In one exemplary implementation, the noise cancellation may be performed using speakers located at a head-mountable display device (HMD) and another speaker, such as a subwoofer, located elsewhere in the environment of the wearer of the HMD. The speakers located at the HMD may be capable of reproducing high-frequency audio to a high standard, but may struggle to reproduce lower-frequency audio to the same standard—this may be due to a reduced size of the speaker, for instance, or a lower-quality speaker. Given these different aptitudes, it can therefore be considered desirable that the noise cancellation process reproduces different parts of a noise cancellation signal at different devices.

Of course, hardware implementations of such methods are not limited to such a hardware arrangement; any combination of devices including headphones, mobile phones, laptops, televisions, and/or game controllers may be used to reproduce audio for the purposes of noise cancellation. Other devices which include speakers (or, of course, dedicated speakers) may also, or instead, be used; implementations are not limited to these disclosed examples. For instance, in some cases a subwoofer which is associated with an in-car audio system may be used to perform a noise cancellation process for a passenger of the vehicle in conjunction with another device.

Figure 11:
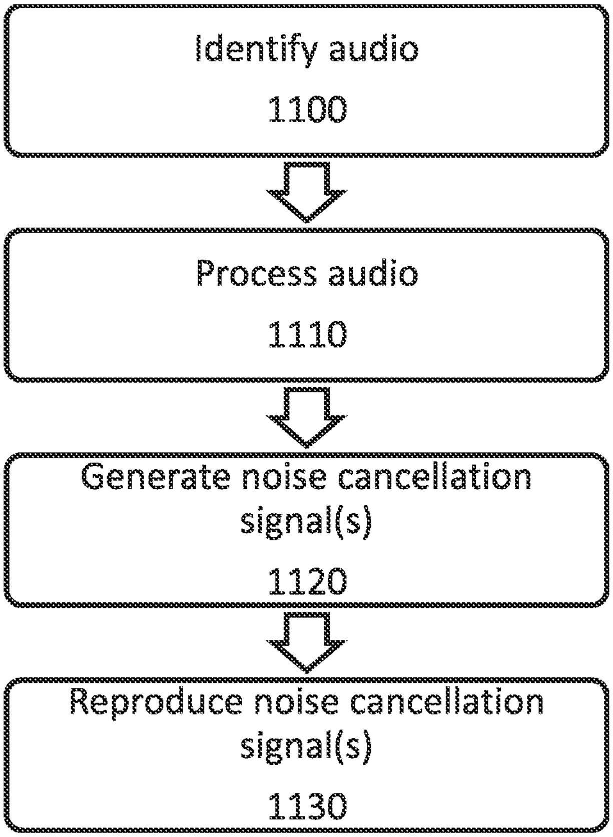
FIG. 11 schematically illustrates a noise cancellation method.

FIG. 11 schematically illustrates an exemplary method for providing such a noise cancellation function.

A step 1100 comprises identifying audio to which a noise cancellation process is to be applied. In some implementations, this may comprise an analysis of audio captured by a microphone in the environment (such as a microphone associated with an HMD or games controller). Alternatively, or in addition, this step may comprise an analysis of an audio file or the like associated with a content reproduction device (such as a music file being played by a computer, or the audio track of a video being watched on a television) so as to identify information about audio being output into the environment. This identification may include determining frequencies associated with the audio, for instance, as well as a source of the audio (for instance, through an audio recognition process).

An optional step 1110 comprises the performing of processing relating to the identified audio. This step may comprise any suitable processing, some examples of which are discussed here. The purpose of such processing is considered to be the improvement of the generation or reproduction of the noise cancellation signals, and as such any processing that contributes to such an effect may be considered suitable at this step.

A first example of processing is that of determining the impact of the audio at the location of the user; this may be particularly useful in the case that a microphone for capturing the audio to be cancelled is sufficiently far from the listener so as to not accurately represent what they hear, for example, and/or in the case that a sound source generating the audio to be cancelled is located sufficiently remotely from a user so as to result in a perceptible difference between the output audio and what the listener hears.

A second example is that of determining a head-related transfer function for one or more listeners. This may further include the determination of a modification to be applied to output audio, in dependence upon this HRTF, so as to account for the relative locations of the noise cancellation audio output and the listener. This may be based upon a tracking and/or estimation of the listener's position and/or orientation, for example, or one or more devices (such as an HMD) which may be associated with a listener.

A third example of processing is that of identifying one or more frequency characteristics of the audio for which the noise cancellation is to be performed. This can be used to determine which audio output units, or which combination of audio output units, would be most suited to generating a corresponding noise cancellation signal. For instance, this may include a comparison of frequencies in the audio with a frequency range for which each of the audio output units is most suited to output.

Another example of processing is that of processing the audio for which the noise cancellation is to be performed so as to segment the audio into different frequency components. These segments may correspond to predefined frequency ranges, such as ranges based upon the audible spectrum for a human listener, typical audio output devices, and/or typical audio generated by different devices. This segmentation may therefore be performed in dependence upon information about the user, the sources of the audio for which the noise cancellation is to be performed, and/or the audio devices to be used for outputting the noise cancellation signal.

A step 1120 comprises generating one or more noise cancellation signals in dependence upon the identified audio. In some implementations, this may comprise the generation of a single noise cancellation signal which is to be selectively output by the audio output units for performing the noise cancellation process; for instance, the audio may be output after being subjected to a frequency filter or threshold process at the audio output unit. Alternatively, a respective noise cancellation signal may be generated for each of the audio output units in dependence upon at least the functionality of each audio output unit (such as the optimal frequency range). Other factors that may be considered include the relative locations of sound sources, audio output units, and the listener, and the functionality of the set of audio output units as a whole, for example.

A step 1130 comprises reproducing, with two or more audio output units, a respective subset of the generated one or more noise cancellation signals, such that the two or more audio output units are configured to produce different outputs. In other words, in the step 1130 each of the audio output units for performing the noise cancellation process outputs a unique signal to contribute to the noise cancellation effect. For instance, a subwoofer may output low frequency portions of the noise cancellation signal while a game controller outputs the higher-frequency portions. The outputs of the respective audio output units are determined so as to accurately reproduce the noise cancellation signal for a particular listener or listeners.

Figure 12:
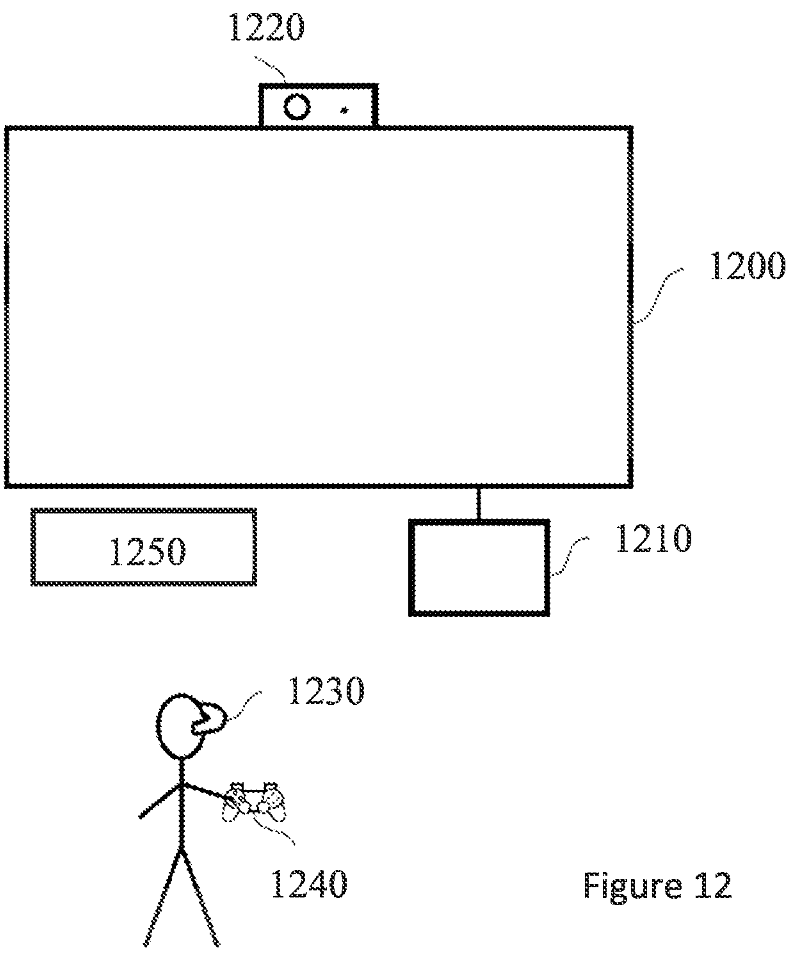
FIG. 12 schematically illustrates an entertainment system.

FIG. 12 schematically illustrates an entertainment system suitable for implementing a noise cancellation method according to FIG. 11. Of course, any suitable combination of devices and peripherals may be used to implement embodiments of the present disclosure, rather than being limited only to the configuration shown in this Figure.

A display device 1200, associated with a games console 1210, is used to display content to one or more viewers; users are considered to be those that interact with the displayed content, such as players of a game, while viewers are those which view the content without interacting with it. This content may be a video game, for example, or any other content such as a movie or any other video content. The games console 1210 is an example of a content providing device; alternative, or additional, devices may include computers, mobile phones, set-top boxes, and physical media playback devices, for example. In some embodiments the content may be obtained by the display device itself—for instance, via a network connection or a local hard drive.

One or more video and/or audio capture devices (such as the integrated video camera and microphone 1220) may be provided to capture images and/or audio in the environment of the display device. While shown as a separate unit in this Figure, it is considered that such devices may be integrated within one or more other units (such as the display device 1200 or the games console 1210 in FIG. 12). In addition to this, a subwoofer (or a speaker arrangement comprising a subwoofer) 1250 is provided which is operable to output low-frequency audio.

In some implementations, an additional or alternative display device such as the HMD 1230 may be provided. Such a display can be worn on the head of a user, and is operable to provide augmented reality or virtual reality content to a user via a near-eye display screen. A user may be further provided with a controller 1240 which enables the user to interact with the games console 1210. This may be through the provision of buttons, motion sensors, cameras, microphones, and/or any other suitable method of detecting an input from or action by a user.

In this exemplary arrangement, it is considered that the user may be subject to external sound which disrupts their enjoyment of content being presented upon the HMD 1230. Examples of such sounds could include building works taking place outside the house, other people in the room having conversations, and/or a neighbour playing loud music, for example. Each of these may represent sound that the user would rather not hear, and therefore can be targets for a noise cancellation process.

In such an example, it may be considered that the noise cancellation is performed by speakers or headphones associated with the HMD 1230 and an output by the subwoofer 1250. The display device 1200 and controller 1240 may also be operable to assist with the noise cancellation, but this is not discussed in the present example.

In this exemplary noise cancellation arrangement, it can be considered that a microphone associated with the HMD 1230 or games console 1210 is operable to capture the undesirable audio (that is, the audio for which the noise cancellation is to be performed). Based upon this captured audio, a noise cancellation signal is generated by the games console 1210 (or another device, such as the HMD 1230) and divided into two portions—respective high-frequency and low-frequency portions for output by the headphones associated with the HMD and the subwoofer 1250, with the division being based upon information about the range of frequencies for which each drive generates a good output. Alternatively, separate signals may be generated for each of these outputs based upon the same frequency constraints.

This generation may be dependent upon a tracking of the location of the user of the HMD 1230 or the HMD 1230 itself as a proxy for the user's ears, so as to establish the audio that would be heard by the user. This dependency may be reflected in both determining the noise to be cancelled (in other words, identify what the user is able to hear) and/or determining the output to be provided to perform the cancellation (in other words, to generate the desired signal with the desired timing at the location of the user's ears). The process may also utilise an HRTF associated with the user as a part of this process.

In some cases, a calibration process may be performed which is used to determine the relative locations of the user and any speakers being used to perform the noise cancellation process, and based upon this information identify or estimate an 'audio path' between respective speakers and the user. This audio path is indicative of the transmission path between a speaker and the user, and may be characterised in terms of the distance, time-of-flight, presence of obstacles, and/or any other factor that contributes to a difference the sound heard by a user and the sound emitted by the speaker. This may be an iterative process, which can be repeated based upon a user moving by more than a threshold amount, elapsed time since the last calibration, or any other trigger condition.

Such a calibration process may utilise any suitable input data to determine these properties. For instance, images of the user's environment may be suitable input data for determining the relative location of elements within the user's environment. Similarly, tracking data based upon other information (such as triangulation via wireless communication between elements) may be appropriate. Alternatively, or in addition, the calibration process may include the output of reference signals by respective signals, each of which is detected by a microphone associated with the user (such as a microphone at an HMD or games controller). Using knowledge of the reference signal, properties of the audio path may be determined through comparison of this with the detected signal.

Rather than having a single microphone, it is considered that both the games console 1210 and the HMD 1230 may be associated with respective microphones. This may assist in ensuring that an accurate representation of the audio in the environment is acquired. In some implementations, it may be considered that these microphones are directional and/or have different frequency capture profiles—this may assist in further characterising the environmental audio (that is, the audio for which the noise cancellation is to be performed).

Rather than a centralised processing being performed such that a single processing unit generates the noise cancellation signal or signals, in some cases this functionality may be divided between different units. For instance, it may be considered advantageous if high-frequency noise cancellation is performed at the HMD 1230 exclusively such that a microphone at the HMD 1230 is used to capture the audio, a processing unit at the HMD 1230 is used to process this signal and generate a noise cancellation signal, and speakers associated with the HMD 1230 are used to output the signal. This may be advantageous in that it can result in a low-latency process which is important for effective high-frequency noise cancellation. In conjunction with this, the subwoofer 1250 may have processing capabilities and a microphone to enable it to perform an equivalent process for a low-frequency signal; alternatively, one or both of the processing capabilities and microphone may be provided by an associated device such as the games console 1210. The latency constraints associated with a low-frequency noise cancellation are considered to be less restrictive, such that the variation in time-of-flight for the audio output and any communication between devices do not preclude effective noise cancellation of the low frequencies in such an arrangement.

In cases in which the noise to be cancelled is generated by the controller 1240, it is considered that an appropriate method from the above discussion may be utilised as a part of the noise cancellation process.

It is therefore considered that noise cancellation processes according to FIG. 11 can be implemented in a number of different ways so as to achieve an effective noise cancellation process using a plurality of audio output devices.

Figure 13:
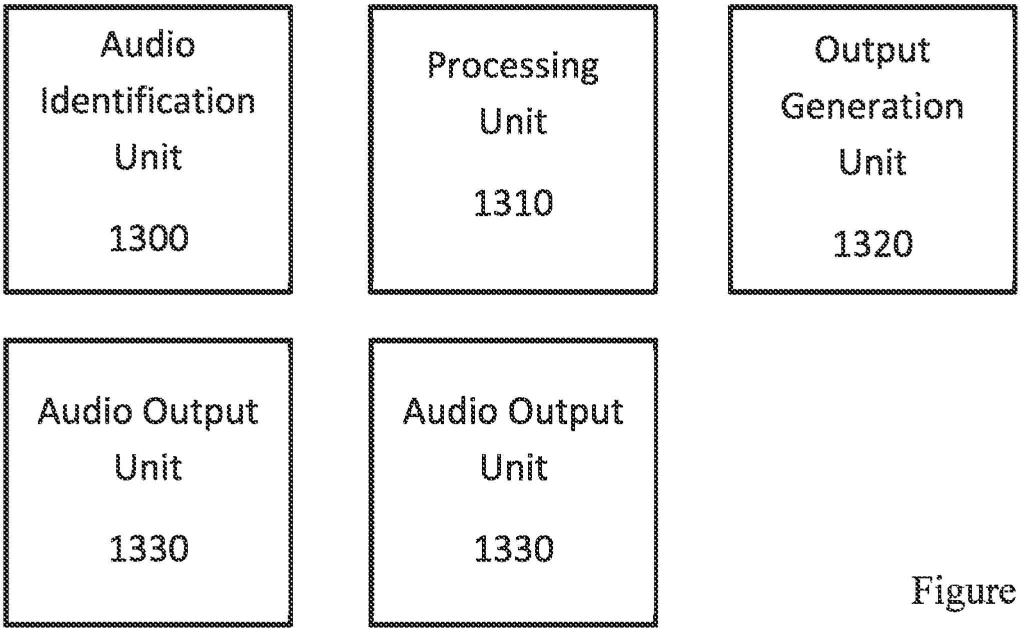
FIG. 13 schematically illustrates a noise cancellation system.

FIG. 13 schematically illustrates a noise cancellation system which is operable to generate and output a noise cancelling signal for two or more audio output devices. The system comprises an audio identification unit 1300, an optional processing unit 1310, an output generation unit 1320, and two or more audio output units 1330. While only two audio output units 1330 are shown here, this is for the sake of clarity and should not be considered to be limiting upon the present disclosure.

The audio identification unit 1300 is configured to identify audio to which a noise cancellation process is to be applied. This audio may correspond to any sound source which the user may prefer not to hear—this may be audio from digital sources (such as other display devices or radios in the user's environment) or analogue sources (such as building works outside) in the vicinity of the user. In some embodiments the sound source may be a controller that is associated with a user, in which the sounds may be the pressing of buttons and/or haptic feedback in accordance with the above discussion. In such cases, it is also considered that a 'listener' for the purposes of the noise cancellation process may be a microphone associated with the controller or another device associated with the user (such as an HMD) that is operable to record audio in the environment for recording and/or transmission to other people.

In some implementations, the system comprises a microphone configured to capture audio for which the noise cancellation process is to be applied—this microphone may be associated with another device in the system (such as a games console or HMD), or may be a standalone device which is operable to communicate information about the captured audio. However, it is also considered that information about external noise can be obtained directly from the sound source, via a signal transmitted by that device which is indicative of the audio output of that device. For example, if the noise to be cancelled is that of a television programme or computer game then it is considered that information about the sound output of the television displaying the programme/game can be obtained without the need for a microphone (for instance, from metadata associated with the programme/game or an analysis of a video file to determine properties of the audio). This is considered to be an example of the audio identification unit 1300 being configured to identify audio from one or more outputs of a device in the listener's environment.

The optional processing unit 1310 is configured to analyse the identified audio and/or perform a sound separation process upon the identified audio. This step may comprise the identification of properties of the audio to be cancelled (such as frequencies, volume, sound source location), as well as properties of the sound source (such as an identity). Examples of such processing are discussed with reference to step 1110 of FIG. 11 above.

The output generation unit 1320 is configured to generate one or more noise cancellation signals in dependence upon the identified audio. In some arrangements it is also considered that the output generation unit 1320 is configured to obtain information about the audio output units 1330 that are able to be utilised for reproducing the noise cancellation signal(s). In some implementations, the output generation unit 1320 may be configured to generate the one or more noise cancellation signals in dependence upon a head-related transfer function (HRTF) of the listener; this may be a full HRTF in some embodiments, while in others it may be considered that a simplified HRTF (such as a function that has a smoothing applied) may be preferable for noise cancellation. Similarly, the HRTF may be used for generating particular noise cancellation signals only—such as those which are a particular distance from a user, or those which correspond to particular frequencies.

In some implementations, the output generation unit 1320 is configured to generate two or more noise cancellation signals in dependence upon one or more audio reproduction characteristics of respective audio output units. In other words, the output generation unit 1320 may be configured to generate a respective noise cancellation signal for each audio output unit 1330 (or each group of audio output units 1330 in the case that more than one audio output unit 1330 is configured to output the same audio). These signals are generated in dependence upon the target audio output unit 1330, for instance taking into account output frequency ranges, relative location with respect to the listener, and/or identified optimal frequency ranges of the audio output devices 1330.

The two or more audio output units 1330 are each configured to reproduce a respective subset of the generated one or more noise cancellation signals, such that the two or more audio output units 1330 are configured to produce different outputs. The respective subsets of the one or more generated noise cancellation signals comprise different frequency components of the noise cancellation signals, for instance, and/or may differ in volume or a time offset. In some examples, frequency components of the outputs may overlap; it is not considered essential that the outputs of the audio output units 1330 are entirely different.

In the case that the respective subsets vary based upon the frequencies associated with the audio, the frequency components of the respective subsets of the generated one or more noise cancellation signals may be selected in dependence upon the distance between the corresponding audio output unit 1330 and a listener. This may be in addition to, or instead of, a dependence upon the specific audio reproduction properties of the respective audio output units 1330.

In some arrangements, each audio output unit 1330 is configured to apply processing to the one or more generated noise cancellation signals to identify a subset of the signals to be reproduced by that audio output unit. For instance, a general noise cancellation signal may be transmitted to an audio output unit 1330 which is then operable to modify that signal so as to generate a signal that is more specific to the properties of that audio output unit 1330. For example, this may include applying one or more frequency thresholds to the signal so as to remove frequency components that are not able to be reproduced (or at least not able to be reproduced with a high quality) by that audio output unit 1330. Processing to identify which portion of the signal to reproduce may be performed in dependence upon an analysis of the audio and/or metadata associated with the noise cancellation signal which identifies characteristics of that signal.

In other words, the output generation unit 1320 may be configured to output a single noise cancellation signal to all audio output units 1330 with each audio output unit 1330 being configured to identify and output a particular portion of the signal. Alternatively, multiple noise cancellation signals may be output to corresponding audio output units 1330 which can then reproduce the entirety of the respective signal.

In some embodiments the audio output units 1330 are implemented as different physical units to the audio identification unit 1300, processing unit 1310, and output generation unit 1320. For instance, these may be standalone speakers while the other units are implemented at one or more processors associated with a games console, computer, and/or HMD. However, in some embodiments it is considered that at least one of the audio output units 1330 comprises a respective audio identification unit 1300, processing unit 1310, and/or output generation unit 1320—in other words, the audio output units 1330 may be configured to perform at least some of the noise cancellation process independent of any other processing device. An example of this is a subwoofer comprising a microphone and a processor that is operable to cancel low-frequency noise that is detected in the environment. While in some cases such an audio output unit 1330 may benefit from inputs such as tracking information for a listener, this may not be required (particularly in the case of low-frequency noise cancellation).

In some arrangements it is considered that the two or more audio output units 1330 may comprise a first audio output unit configured to reproduce a respective subset of the generated one or more noise cancellation signals for two or more listeners, and at least a second and third audio output unit configured to reproduce a respective subset of the generated one or more noise cancellation signals for a listener, of the two or more listeners, corresponding to that audio output unit. This may be particularly advantageous in the case that the first audio output unit is used to cancel low-frequency audio (as this may be less dependent upon the position of the respective listener) while the other units are configured to cancel higher frequency audio. An exemplary use cases include a single subwoofer used in conjunction with respective HMDs for each listener, for instance. This can be advantageous in a number of different use cases, including those outside the home; for instance, a car may be equipped with a subwoofer for low-frequency noise cancellation (such as those associated with the car's engine) while personal devices are configured to generate high-frequency signals for respective users.

The first audio output unit 1330 may be selected to output low-frequency noise cancellation signals; examples of suitable devices include a subwoofer, a vehicle, a television, a surround sound system, and/or a cinema sound system. The second audio output unit 1330 may be selected to output high-frequency noise cancellation signals; examples of suitable devices include a head-mountable display device, headphones, a games controller, a mobile phone, and/or a laptop computer. Additional audio output units 1330 may be selected freely, with the aim of utilising devices having varying locations and/or audio output properties so as to enhance the noise cancellation process in accordance with the above discussion. Suitability of an audio output device for the reproduction of particular frequencies may be determined based upon the diameter of the speaker cone, for instance, or any other physical properties which correlate with generation of particular frequencies of sound.

It is not necessary that the audio output units 1330 are specialised for a particular output (for instance, a television could be used for low frequencies rather than a subwoofer which is specifically designed to output low-frequency audio); it may be sufficient that there is a difference in the quality of reproduction between different audio output units 1330. For example, while speakers associated with an HMD and a television may both be more suited to high-frequency audio reproduction it may be considered that the television is better-suited to low-frequency audio reproduction. In view of this, the television may be delegated the function of providing those low-frequency outputs despite this not representing the best quality audio output for the television. Such a delegation process may be performed in any suitable manner for determining a suitable use for audio output devices 1330 based upon information about the audio reproduction properties of those devices and/or information about their locations (such that audio output units 1330 nearer to the user are prioritised for high-frequency noise cancelling outputs).

The arrangement of FIG. 13 is an example of a system comprising a processor (for example, a GPU and/or CPU located in a games console or any other computing device) and two or more audio output units that is operable to generate and output a noise cancellation process, and in particular is operable to: identify audio to which a noise cancellation process is to be applied; optionally analyse the identified audio and/or perform a sound separation process upon the identified audio, generate one or more noise cancellation signals in dependence upon the identified audio; and reproduce a respective subset of the generated one or more noise cancellation signals, such that two or more audio output units are configured to produce different outputs.

The techniques described above may be implemented in hardware, software or combinations of the two. In the case that a software-controlled data processing apparatus is employed to implement one or more features of the embodiments, it will be appreciated that such software, and a storage or transmission medium such as a non-transitory machine-readable storage medium by which such software is provided, are also considered as embodiments of the disclosure.

Thus, the foregoing discussion discloses and describes merely exemplary embodiments of the present invention. As will be understood by those skilled in the art, the present invention may be embodied in other specific forms without departing from the spirit or essential characteristics thereof. Accordingly, the disclosure of the present invention is intended to be illustrative, but not limiting of the scope of the invention, as well as other claims. The disclosure, including any readily discernible variants of the teachings herein, defines, in part, the scope of the foregoing claim terminology such that no inventive subject matter is dedicated to the public.

Embodiments of the present disclosure may be implemented in accordance with any one or more of the following numbered clauses:

1. A noise cancellation system comprising: an audio identification unit configured to identify audio to which a noise cancellation process is to be applied; an output generation unit configured to generate one or more noise cancellation signals in dependence upon the identified audio; and two or more audio output units each configured to reproduce a respective subset of the generated one or more noise cancellation signals, such that the two or more audio output units are configured to produce different outputs.

2. A system according to clause 1, wherein the system comprises a microphone configured to capture audio for which the noise cancellation process is to be applied.

3. A system according to any preceding clause, wherein the audio identification unit is configured to identify audio from one or more outputs of a device in the listener's environment.

4. A system according to any preceding clause, comprising a processing unit configured to analyse the identified audio and/or perform a sound separation process upon the identified audio.

5. A system according to any preceding clause, wherein the output generation unit is configured to generate two or more noise cancellation signals in dependence upon one or more audio reproduction characteristics of respective audio output units.

6. A system according to any preceding clause, wherein each audio output unit is configured to apply processing to the one or more generated noise cancellation signals to identify a subset of the signals to be reproduced by that audio output unit.

7. A system according to any preceding clause, wherein the respective subsets of the one or more generated noise cancellation signals comprise different frequency components of the noise cancellation signals.

8. A system according to clause 7, wherein the frequency components of the respective subsets of the generated one or more noise cancellation signals are selected in dependence upon the distance between the corresponding audio output unit and a listener.

9. A system according to any preceding clause, wherein each of the audio output units comprises a respective audio identification unit and/or output generation unit.

10. A system according to any preceding clause, wherein the two or more audio output units comprise a first audio output unit configured to reproduce a respective subset of the generated one or more noise cancellation signals for two or more listeners, and at least a second and third audio output unit configured to reproduce a respective subset of the generated one or more noise cancellation signals for a listener, of the two or more listeners, corresponding to that audio output unit.

11. A system according to any preceding clause, wherein the output generation unit is configured to generate the one or more noise cancellation signals in dependence upon a head-related transfer function of the listener.

12. A system according to any preceding clause, wherein a first audio output unit is selected to output low-frequency noise cancellation signals, and a second audio output unit is selected to output high-frequency noise cancellation signals.

13. A noise cancellation method comprising: identifying audio to which a noise cancellation process is to be applied; generating one or more noise cancellation signals in dependence upon the identified audio; and reproducing, with two or more audio output units, a respective subset of the generated one or more noise cancellation signals, such that the two or more audio output units are configured to produce different outputs.

14. Computer software which, when executed by a computer, causes the computer to carry out the method of clause 13.

15. A non-transitory machine-readable storage medium which stores computer software according to clause 14.

The invention claimed is:

1. A system comprising:

one or more processors;

two or more speakers communicatively coupled to the one or more processors; and one or more memories storing instructions that, when executed by the one or more processors, cause the one or more processors to perform operations comprising:

identifying an audio signal to which a noise cancellation process is to be applied;

generating one or more noise cancellation signals based upon the audio signal, one or more audio reproduction characteristics of each respective speaker of the two or more speakers, and a head-related transfer function for a listener; and providing the one or more noise cancellation signals to the two or more speakers, wherein providing the one or more noise cancellation signals to the two or more speakers causes each speaker of the two or more speakers to reproduce a respective subset of the one or more noise cancellation signals.

2. The system of claim 1, further comprising a microphone configured to capture audio for which the noise cancellation process is to be applied.

3. The system of claim 1, wherein the audio signal is generated from one or more outputs of a device in an environment of the listener.

4. The system of claim 1, wherein the operations further comprise performing a sound separation process upon the audio signal.

5. The system of claim 1, wherein each speaker of the two or more speakers is configured to process the one or more noise cancellation signals to identify the respective subset of the noise cancellation signals to be reproduced.

6. The system of claim 1, wherein respective subsets of the one or more noise cancellation signals comprise different frequency components.

7. The system of claim 6, wherein frequency components of respective subsets of the one or more noise cancellation signals are selected in dependence upon a distance between each speaker of the two or more speakers and the listener.

8. The system of claim 1, wherein each speaker of the two or more speakers comprises a sound generating element.

9. The system of claim 1, wherein the two or more speakers comprise:

a first speaker configured to reproduce a first subset of the one or more noise cancellation signals;

a second speaker configured to reproduce a second subset of the one or more noise cancellation signals; and a third speaker configured to reproduce a third subset of the one or more noise cancellation signals.

10. The system of claim 1, wherein a first speaker of the two or more speakers is selected to output low-frequency noise cancellation signals, and a second speaker of the two or more speakers is selected to output high-frequency noise cancellation signals.

11. The system of claim 1, wherein the head-related transfer function for the listener is defined based on a position or an orientation of a head of the listener with respect to a device generating the audio signal.

12. The system of claim 11, wherein the audio signal is generated responsive to a button press of the device.

13. The system of claim 11, wherein the audio signal is generated responsive to a haptic feedback of the device.

14. A method comprising:

identifying an audio signal to which a noise cancellation process is to be applied;

generating one or more noise cancellation signals based upon the audio signal, one or more audio reproduction characteristics of a respective speaker of two or more speakers, and a head-related transfer function of a listener; and providing the one or more noise cancellation signals to two or more speakers, wherein providing the one or more noise cancellation signals to the two or more speakers causes each speaker of the two or more speakers to reproduce a respective subset of the one or more noise cancellation signals.

15. The method of claim 14, wherein the head-related transfer function for the listener is defined based on a position or an orientation of a head of the listener with respect to a device generating the audio signal.

16. The method of claim 15, wherein the audio signal is generated responsive to a button press of the device.

17. The method of claim 15, wherein the audio signal is generated responsive to a haptic feedback of the device.

18. A non-transitory machine-readable storage medium which stores computer software which, when executed by a computer, causes the computer to perform a method comprising:

identifying an audio signal to which a noise cancellation process is to be applied;

generating one or more noise cancellation signals based upon the audio signal, one or more audio reproduction characteristics of a respective speaker of two or more speakers, and a head-related transfer function of a listener; and providing the one or more noise cancellation signals to two or more speakers, wherein providing the one or more noise cancellation signals to the two or more speakers causes each speaker of the two or more speakers to reproduce a respective subset of the one or more noise cancellation signals.

19. The non-transitory machine-readable storage medium of claim 18, wherein the head-related transfer function for the listener is defined based on a position or an orientation of a head of the listener with respect to a device generating the audio signal.

20. The non-transitory machine-readable storage medium of claim 19, wherein the audio signal is generated responsive to a button press of the device.

* * * * *